Patented Dec. 4, 1923.

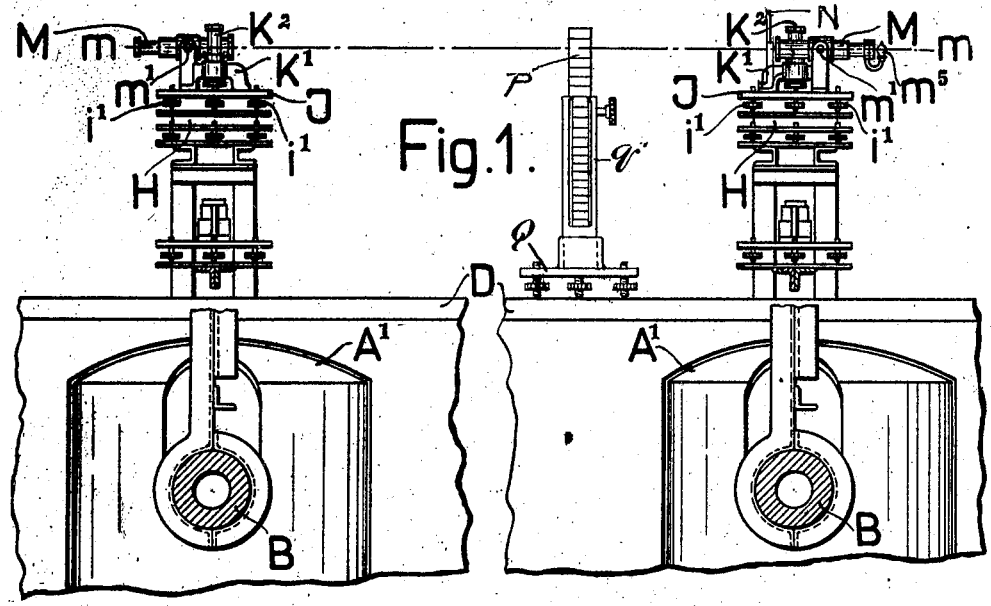
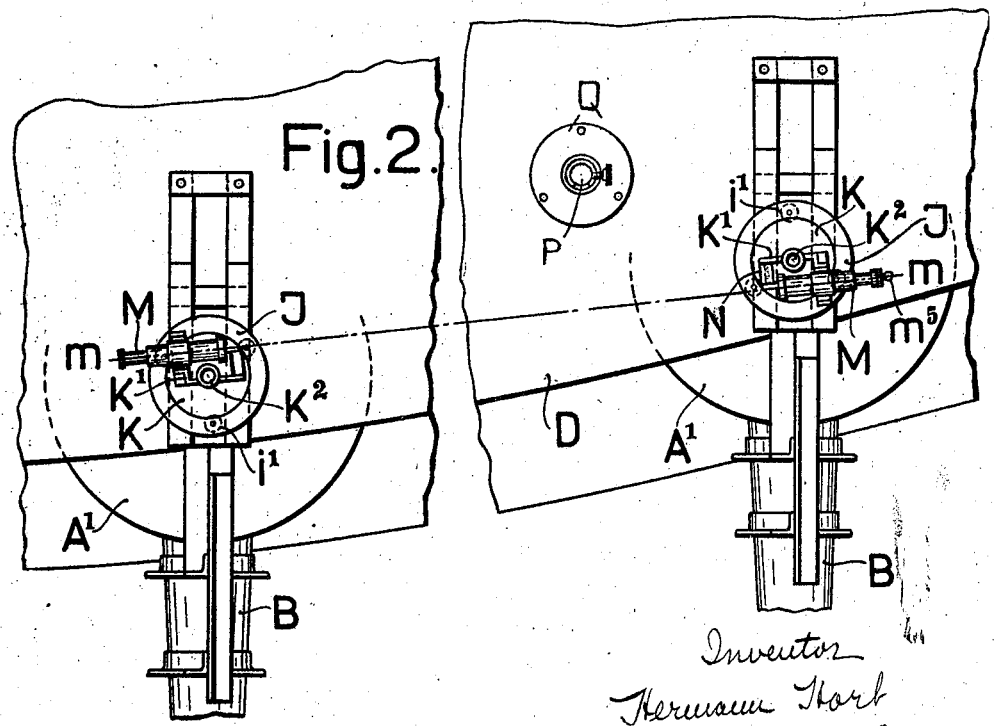

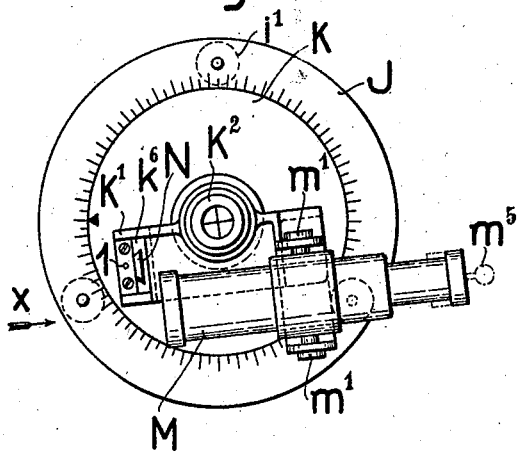
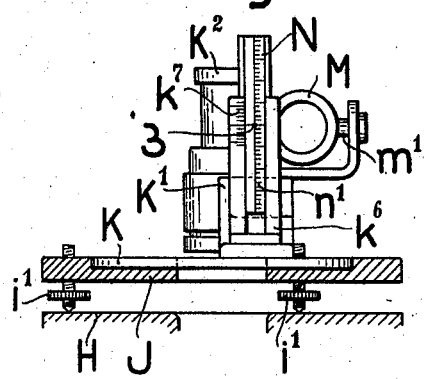
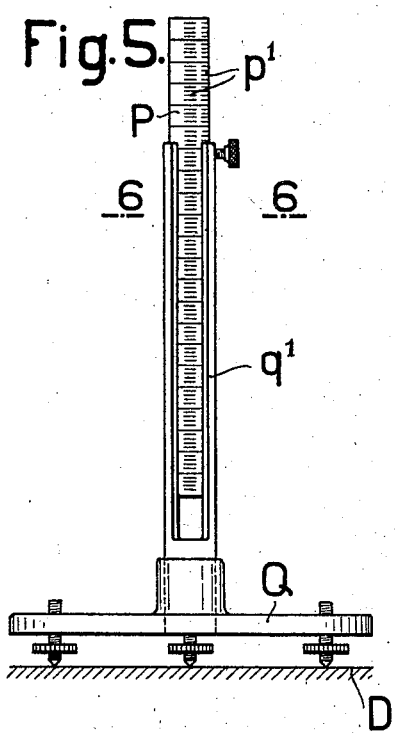
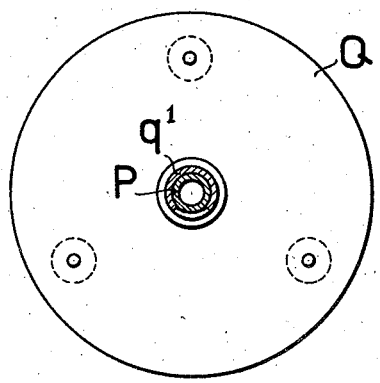

1,476,077

UNITED STATES PATENT OFFICE.

HERMANN HORT, OF ESSEN, GERMANY, ASSIGNOR TO FRIED. KRUPP AKTIENGESELL-SCHAFT, OF ESSEN-ON-THE-RUHR, GERMANY.

APPARATUS FOR THE DETERMINATION OF THE DIRECTION OF THE AXIS OF ROTATION OF A BODY.

Application filed April 28, 1921. Serial No. 465,255.

*To all whom it may concern:*

Be it known that I, HERMANN HORT, residing at Essen, Germany, a citizen of the German Republic, have invented a certain new and useful Improvement in Apparatus for the Determination of the Direction of the Axis of Rotation of a Body, of which the following is a specification.

This invention relates to apparatus for setting the axis of rotation of one body in a position parallel with the axis of rotation of a second body, in which in accordance with claim 3 of my Patent No. 1,434,209, both rotatable bodies are each provided with an optical instrument which has a sighting line running in a transverse direction to the axis of rotation of the rotatable body belonging thereto, and of which optical instruments that belonging to the first-named rotatable body, which latter can be set by adjusting devices arranged on its bearing, is constructed in the form of a telescope sight.

In the specification of my above-mentioned former patent application it has been proposed to effect the parallel setting of the two axes of rotation, by bringing, within the field of view of the sighting telescope mounted on the first body transversely to its axis of rotation, the cross wires of this telescope sight into register, by eye-sight, with cross wires which are present in the image of the mark of the optical instrument mounted on the second rotatable body transversely to its axis of rotation.

Now the object of my present invention is to increase the accuracy of the adjustment by which the parallel setting of the two axes of rotation is effected.

The invention will be described with reference to the accompanying drawings, which show, by way of example, the apparatus as applied to the arrangement of Figure 2 of my above-mentioned former specification.

Fig. 1 being a side elevation of the arrangement and the apparatus applied thereto and Fig. 2 the corresponding plan view, in accordance with Fig. 2 of the former specification, Fig. 3 a portion of Fig. 2, represented on a larger scale, Fig. 4 a front view of the parts shown in Fig. 3, looking from the left (in the direction of the arrow $x$ shown in Fig. 3), Fig. 5 is a side elevation of an additional apparatus forming part of the invention, likewise represented on a larger scale, and Fig. 6 a section on line 6—6 of Fig. 5 looking from above.

The same reference letters are used to denote the several parts of the apparatus. $K\ K^1\ K^2$ denote the two rotatable bodies which are constructed in the form of sighting telescopes and the axes of rotation of which are to be set parallel with each other, and it is assumed, as in my former patent specification, that the axis of rotation of the body $K\ K^1\ K^2$ situated over the left hand gun $B\ A^1$ is the one which is to be set, while the axis of rotation of the body $K\ K^1\ K^2$ situated over the right hand gun retains its position unaltered. The base plates $J$, which rest, by means of the adjustable levelling screws $i^1$, on the adjusting tables $H$ form the bearing with respect to which each of the two bodies $K\ K^1\ K^2$ can be rotated. The two optical instruments which are mounted transversely to the axis of rotation of the bodies $K\ K^1\ K^2$ are formed by the sighting telescopes $M$, which are rotatably mounted on the bodies $K\ K^1\ K^2$ by means of the pivots $m^1$ arranged at right angles to the axis of rotation of the bodies $K\ K^1\ K^2$. The telescope $M$ appertaining to the right hand body $K\ K^1\ K^2$ is provided, in front of its eyepiece, with an incandescent lamp $m^5$ for the purpose of illuminating the image of its mark, which lamp $m^5$ can be swung aside. When this lamp is swung into position and the image of the mark is illuminated, the telescope consequently acts as a collimator, while when the incandescent lamp $m^5$ is swung aside, it can be used as a sighting telescope.

The above-described arrangement corresponds to the arrangement described in my former patent specification.

Now according to the present invention the right hand body $K\ K^1\ K^2$, the axis of rotation of which has to retain its position unchanged, has fixed to it, a dovetail guiding piece $k^6$ (Figs. 3 and 4) in which a level scale N carrying a division $n'$ can be moved longitudinally and is adjustable along a scale $k^7$ of a guiding piece $k^6$ in such a manner (which will not be described in detail here) that the zero point of the division $n'$ lies in the plane passing through the sighting line of the corresponding sighting telescope M parallel with the axis of the pivots $m^1$. The position of the level scale N is so selected, that the left hand telescope M can be directed thereon. On the deck D of the ship there is mounted to one side (see Figure 2) a second level scale P of circular section (see Figs. 5 and 6) carrying a plurality of parallel divisions $p^1$ which level scale P may be displaced longitudinally within a slotted sleeve $q^1$ secured to a base plate Q.

To set the axes of the two bodies K $K^1$ $K^2$ parallel with each other the two telescopes M are first turned towards each other so that the cross wires of the telescope M of the right hand gun $A^1$ B, illuminated by the incandescent lamp $m^5$, appear in the field of view of the telescope M situated over the left hand gun $A^1$ B. The instrument J, K $K^1$ $K^2$, M situated over the left hand gun is then so adjusted, if necessary by manipulating the levelling screws $i^1$, that the center points of the cross wires of the two telescopes M coincide. In this position in which the sighting lines of both telescopes fall into the direction m—m, the telescopes are secured relatively to their respective bodies K $K^1$ $K^2$. Next, after the level scale N has been so adjusted that its zero point 3 lies in the plane passing through the sighting line of the corresponding telescope M parallel with the axis of the pivots $m^1$, the telescope M on the left hand gun is then directed to this level scale N by rotating the body K $K^1$ $K^2$. If the axis of the left hand body K $K^1$ $K^2$ were parallel with the axis of rotation of the one situated on the right, the center point of the cross wires would coincide in the field of view of the left hand telescope with the zero point 3 of the level scale N.

As, however, the two axes of rotation, as is to be assumed, are not yet parallel, the center point of the cross wires must point to a point on the division $n'$ of the level scale N which lies a definite amount $\pm h$ above or below the zero point 3. By rotating the right hand body K $K^1$ $K^2$, the telescope M mounted thereon, is directed (after the incandescent lamp $m^5$ has been swung aside) to the level scale P, on which scale the height $h_o$ of that point (coinciding with the center point of the cross wires) which lies at the same height as the zero point 3 of the first level scale N is read off. Then the point with the height $(h_o \pm h)$ is determined on the second level scale P and to this point is directed the left hand telescope M by rotating this latter together with the body K $K^1$ $K^2$ relatively to the bearing J and by correcting at the same time, the direction of the axis of rotation by adjusting the levelling screws $i^1$.

By this means the axis of rotation of the left hand body K $K^1$ $K^2$ has been set, in a first approximation, parallel with that of the one situated on the right. The left hand telescope M is now again directed on to the scale N, on which the center point of the cross wires now points to a point of the division $n'$ which lies by a considerably smaller amount $\pm h^1$ above or below the zero point 3, than it did in the first case. Then the left hand telescope M is again directed on to the second level scale P and so adjusted in the manner described (by adjustment of the levelling screws $i^1$ that the center point of its cross wires points to the point having the height $(h_o + h')$. The axis of rotation of the left hand body K $K^1$ $K^2$ then has been adjusted with a second approximation parallel with that of the right hand body. The operation described is repeated until on passing from one scale N to the other P no change in the height of the center point of the cross wires can be detected. This case indicates that the two axes of rotation are parallel. This condition of things will commonly be attained even after a very short time.

It is not absolutely necessary at the commencement of the operation, as described, to so adjust the two telescopes that the center points of their cross wires coincide exactly in the field of view of the left hand telescope. It is even sufficient to make the adjustment approximately by the eye. In this case the incandescent lamp $m^5$ may be dispensed with.

It is also not necessary, to mount the first level scale N, on the body K $K^1$ $K^2$ itself, on the contrary, it may be mounted on the bearing J or alongside it on the deck D of the ship.

Claims:

1. In an apparatus for setting the axis of rotation of one body in a position parallel with the axis of rotation of a second body, two rotatable bodies, a telescope fixed to each rotatable body, each telescope having a sighting line running transversely to the axis of rotation of the body appertaining thereto, one of said rotatable bodies being adjustably mounted, two level scales, one of said level scales being disposed adjacent the other of said rotatable bodies whereby it can be read off through the telescope of the first rotatable body, said second level scale being so disposed that it can appear in the field of view of both telescopes.

2. In an apparatus for setting the axis of rotation of one body in a position parallel with the axis of rotation of a second body, two rotatable bodies, a telescope secured to each rotatable body, each telescope having a sighting line running transversely to the axis of rotation of the body appertaining thereto, adjustable bearings for supporting one rotatable body, two level scales, one of said level scales being disposed adjacent the other rotatable body, whereby it is disposed in the line of sight of the telescope of the first mentioned rotatable body, said second level scale being so disposed that it can appear in the field of view of both of said telescopes and an illuminating means associated with said second telescope.

The foregoing specification signed at Essen, Germany, this 4th day of March, 1921.

Dr. HERMANN HORT.